(12) United States Patent
Zhu et al.

(10) Patent No.: US 11,294,750 B2
(45) Date of Patent: Apr. 5, 2022

(54) MEDIA MANAGEMENT LOGGER FOR A MEMORY SUB-SYSTEM

(71) Applicant: Micron Technology, Inc., Boise, ID (US)

(72) Inventors: Fangfang Zhu, San Jose, CA (US); Ying Yu Tai, Mountain View, CA (US); Jiangli Zhu, San Jose, CA (US); Wei Wang, Dublin, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/784,926

(22) Filed: Feb. 7, 2020

(65) Prior Publication Data

US 2021/0019218 A1    Jan. 21, 2021

Related U.S. Application Data

(60) Provisional application No. 62/874,304, filed on Jul. 15, 2019.

(51) Int. Cl.
*G06F 11/07*    (2006.01)

(52) U.S. Cl.
CPC ........ *G06F 11/0778* (2013.01); *G06F 11/073* (2013.01); *G06F 11/0766* (2013.01); *G06F 11/0781* (2013.01); *G06F 11/0784* (2013.01); *G06F 11/0787* (2013.01)

(58) Field of Classification Search
CPC ............. G06F 11/0784; G06F 11/0781; G06F 11/0766; G06F 11/0787; G06F 11/073; G06F 11/0778; G06F 11/3476; G06F 11/3636; G06F 11/3466; G06F 11/3495; G06F 11/364

See application file for complete search history.

(56) References Cited

U.S. PATENT DOCUMENTS

| 2005/0288903 | A1* | 12/2005 | Jackson | G07C 3/00 |
| | | | | 702/187 |
| 2009/0070633 | A1* | 3/2009 | Staneff | G06F 11/3672 |
| | | | | 714/45 |
| 2012/0131382 | A1* | 5/2012 | Higeta | G06F 11/076 |
| | | | | 714/6.13 |
| 2012/0216079 | A1* | 8/2012 | Fai | G06F 11/362 |
| | | | | 714/42 |
| 2013/0055032 | A1* | 2/2013 | Cole | G06F 11/0781 |
| | | | | 714/45 |
| 2013/0159780 | A1* | 6/2013 | Bedwell | G06F 11/3466 |
| | | | | 714/45 |

(Continued)

*Primary Examiner* — Bryce P Bonzo
*Assistant Examiner* — Albert Li
(74) *Attorney, Agent, or Firm* — Schwegman Lundberg & Woessner, P.A.

(57) ABSTRACT

In an embodiment, a system includes a plurality of memory components and a processing device. The processing device includes a command-lifecycle logger component that is configured to perform command-lifecycle-logging operations, which include detecting a triggering event for logging command-lifecycle debugging data, and responsively logging command-lifecycle debugging data. Logging command-lifecycle debugging data includes generating the command-lifecycle debugging data and storing the generated command-lifecycle debugging data in data storage.

19 Claims, 7 Drawing Sheets

(56) References Cited

U.S. PATENT DOCUMENTS

| | | | |
|---|---|---|---|
| 2014/0089354 A1* | 3/2014 | Gonsalves | G06F 16/2358 707/812 |
| 2016/0098326 A1* | 4/2016 | Rebello | G06F 11/364 714/55 |
| 2018/0285233 A1* | 10/2018 | Norrie | G06F 11/302 |
| 2019/0324649 A1* | 10/2019 | Rodgers | G06F 11/3072 |
| 2020/0110652 A1* | 4/2020 | Zapotylok | G06F 11/0775 |
| 2020/0125437 A1* | 4/2020 | Kataria | G06F 11/0727 |

\* cited by examiner

MEDIA MANAGEMENT LOGGER FOR A MEMORY SUB-SYSTEM

CROSS-REFERENCE TO RELATED APPLICATIONS

This application claims the benefit of U.S. Provisional Patent Application Ser. No. 62/874,304, filed Jul. 15, 2019 and entitled "Media Management Logger for a Memory Sub-System," the entirety of which is hereby incorporated herein by reference.

TECHNICAL FIELD

Embodiments of the disclosure relate generally to memory sub-systems and more specifically to a media management logger for a memory sub-system.

BACKGROUND

A memory sub-system can be a storage device, a memory module, or a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Implementations of the present disclosure are directed to a media management logger for a memory sub-system. A memory sub-system can be a storage device, a memory module, or a hybrid of a storage device and a memory module. Examples of storage devices and memory modules are described below in connection with FIG. 1. In general, a host system can utilize a memory sub-system that includes one or more memory components (also referred to herein as "memory devices"). The host system can provide data to be stored at the memory sub-system and can request data to be retrieved from the memory sub-system.

The host system can send access requests to the memory sub-system, such as to store data at the memory sub-system and to read data from the memory sub-system. The data to be read and written are hereinafter referred to as "user data". A host request can include a logical address (e.g., logical block address (LBA)) for the user data, which is the location the host system associates with the user data. The logical address (e.g., LBA) can be part of metadata for the user data.

A data path refers to the logical course or path that user data and metadata follow as they move throughout the memory sub-system. The data path in the memory sub-system handles read and write data commands received from the host system. The data path encompasses the complete, end-to-end course taken by data as it is either written to or read from the underlying memory devices.

A control path refers to the logical course or path that provides different control signals, for example, to components on the data path to control how the data path works properly. The control path and data path include digital circuitry, registers, and interconnecting buses.

Operational errors, system failures, and/or the like occur from time to time with respect to memory sub-systems. It can be evident from the perspective of a host system that an event such as this has occurred in connection with a memory sub-system if the memory sub-system reports the occurrence of an error, an exception, an assertion, a condition (e.g., high temperature), and/or the like to the host system, or if the memory sub-system fails to meet one or more performance metrics. In some cases, a host system can become aware of a problem with a memory sub-system when the host system receives a hardware interrupt from the memory-sub-system. In other instances, the host system may become aware of a problem with a memory sub-system if the memory sub-system becomes unresponsive, goes offline, becomes disabled, and/or the like. In some cases, the host system may attempt to reset or restart the memory sub-system.

In connection with current implementations of memory sub-systems, even when the existence of a problem such as this with a memory sub-system is known, it can be difficult if not impossible to determine the cause of the problem. A memory sub-system controller operates at high-throughput input/output (I/O) and at high speeds such that it may be difficult to debug when errors occur internal to the memory sub-system controller.

Aspects of the present disclosure address the above and other deficiencies with a media management logger system for debugging and logging in a memory sub-system. In accordance with at least one implementation of the present disclosure, the media management component of the memory sub-system controller includes a triggerable, hardware-based command-lifecycle logger that logs debugging data upon the occurrence of one or more triggering events.

The debugging data can be used, e.g., by a host system, following the occurrence of one or more problems, failures, and/or the like in the operation of the memory sub-system. In some implementations of the present disclosure, the host system can access the debugging data via an interface such as universal asynchronous receiver-transmitter (UART), peripheral component interconnect express (PCIe), or non-volatile memory express (NVMe), as examples. The host device can rebuild the event sequence recorded in the debugging data by, for example, ordering debugging data records by timestamp data in the records.

The triggering events can include both firmware and hardware events, as discussed herein. The debugging data can be stored in any one or more of a number of different storage locations including memory (e.g., static RAM (SRAM)) internal to the media management component, local memory of the memory sub-system controller, a memory device (e.g., a dynamic RAM (DRAM) device or non-volatile memory device such as a NAND-type or three-dimensional (3D) cross-point memory device) available to (e.g., on the same circuit board as) the memory sub-system controller, and/or data storage on the host system, as examples.

Furthermore, the logging of the debugging data can continue until a predetermined amount of time elapses, a predetermined amount of debugging data has been stored in connection with the incident triggering event, or a predetermined stop-logging event occurs, as examples. In some implementations, the amount of stored debugging data per triggering event is limited by the lifecycle-command logger to a certain quantum (e.g., one gigabyte (GB)) of debugging data, and the media management component keeps the first such quantum that is stored or the most recent such quantum that is stored, among other possible implementations.

The type of parameters stored in the debugging data can include, for a given media-management-component command, data related to the lifecycle (e.g., start, dispatch, internal state, completion) of execution of the command, providing traces of the command traversing the control path of the memory sub-system. A command identifier can also be stored in the debugging data with respect to a given media-management-component command. The command state, which is a command-internal timestamp that iterates during execution of a given command, can be stored as well, as can timestamp data reflecting timestamps from a clock that is global with respect to any given command. The command type (e.g., read, write) can be stored, as can the address (e.g., block address, media address) to which the command is directed. Other debugging data that can be stored includes data identifying media-management-component firmware events, as well as data identifying the triggering event that caused the debugging data to be stored in the first place. Other parameters deemed suitable by those of skill in the art having the benefit of this disclosure could be stored as well.

The media management component can record the life cycle of a command. The command can be a host system-initiated command or a memory sub-system controller-initiated command. The life cycle can include, for example, the start, state(s), and completion of the command. The media management component can provide traces of events that occur as the command is processed via a control path. The media management component can store debugging data for the events that occur as the command is processed via the control path.

Among the benefits of implementations of the present disclosure is that, unlike current implementations, the debugging data that is logged in accordance with implementations of the present disclosure is generated and stored by hardware that is operating at the speeds at which the firmware and hardware that is producing the triggering events for the debugging data to be stored is also operating. The hardware can be part of the memory sub-system controller. The hardware can include digital circuitry with dedicated (i.e., hard-coded) logic to perform the operations described herein. Due to being hardware-based as opposed to being in software (executing on, e.g., an embedded processor of a memory sub-system controller), an increased and much more useful level of detail is provided in the debugging data. This debugging data is then available to be fetched and analyzed by, e.g., a host system to analyze and determine the cause of one or more memory sub-system error conditions, system failures, and/or the like. Other benefits of implementations of the present disclosure will be evident to those of skill in the art.

Figure 1:
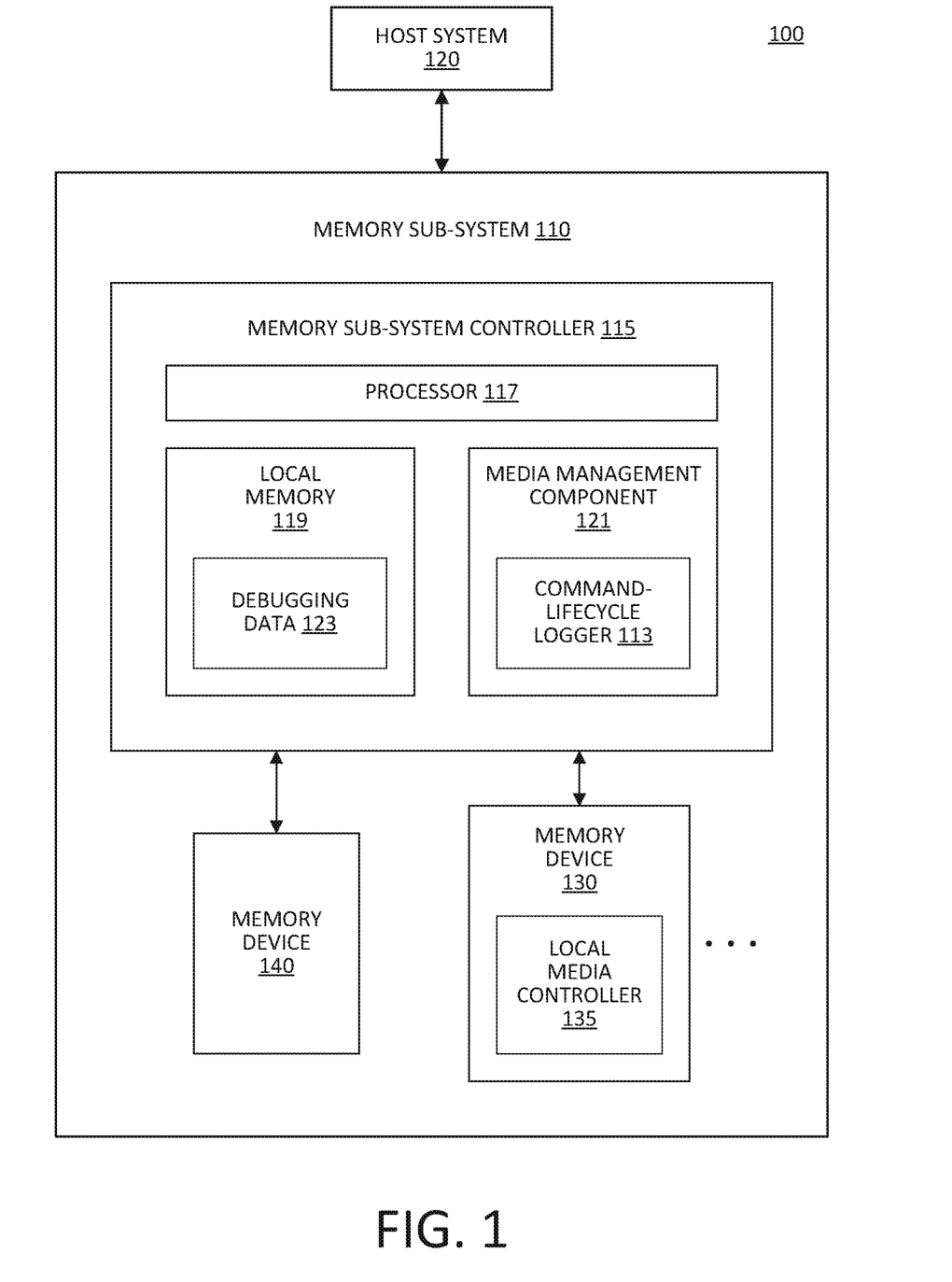
FIG. 1 illustrates an example computing environment that includes a memory sub-system that includes a memory sub-system controller in accordance with some embodiments of the present disclosure.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates an example of the host system 120 coupled to one memory sub-system 110. The host system 120 uses the memory sub-system 110, for example, to write user data to the memory sub-system 110 and read user data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), etc. The physical host interface can be used to transmit data (e.g., user data) between the host system 120 and the memory sub-system 110. The host system 120 can further utilize an NVMe interface to access the memory components (e.g., memory devices 130) when the memory sub-system 110 is coupled with the host system 120 by the PCIe interface. The physical host interface can provide an interface for passing control, address, user data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as DRAM and synchronous DRAM (SDRAM).

An example of non-volatile memory devices (e.g., memory device 130) includes 3D cross-point type flash memory, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

In some embodiments, each of the memory devices 130 can include one or more arrays of memory cells such as single level cells (SLCs), multi-level cells (MLCs), triple level cells (TLCs), quad-level cells (QLCs), or a combination of such. In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or another suitable processor.

Furthermore, in some implementations, the memory sub-system controller 115 includes a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing microcode. While the example memory sub-system 110 in FIG. 1 is illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system 110).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear-leveling operations, garbage collection operations, error detection and error-correcting code (ECC) operations, encryption operations, caching operations, and address translations between a logical address (e.g., logical block address (LBA)) and a physical address that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 as well as convert responses associated with the memory devices 130 into information for the host system 120. The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the media device 130 (e.g., perform media management operations on the media device 130). In some embodiments, the memory devices 130 can be locally managed memory devices, which is a raw memory device combined with a local media controller 135 that performs memory management operations on the memory device 130 within the same memory device package.

The memory sub-system controller 115 includes a media management component 121 to manage the memory devices 130. As depicted in FIG. 1, in at least one embodiment, the media management component 121 includes a command-lifecycle logger 113, which can take the form of or include circuitry, dedicated logic, programmable logic, firmware, software, and/or the like for performing at least the command-lifecycle-logger operations described herein. In some embodiments, the memory sub-system controller 115 includes at least a portion of the command-lifecycle logger 113—the processor 117 can be configured to execute instructions stored in the local memory 119 for performing command-lifecycle-logger operations. In some embodiments, the command-lifecycle logger 113 is part of the host system 120, an application, or an operating system. Various functions that are performed by the command-lifecycle logger 113 in different combinations in different embodiments are described throughout this disclosure.

As shown in the depicted embodiment, the local memory 119 can store debugging data 123, which is described herein as being generated and stored by the command-lifecycle logger 113 to in accordance with implementations of the present disclosure. Moreover, it is noted that the arrangement that is depicted in FIG. 1, in which the debugging data 123 is stored in the local memory 119, is by way of example and not limitation. In other implementations, the debugging data 123 is stored in the memory devices 130, the memory device 140, and/or the host system 120. Furthermore, in some implementations, the debugging data 123 is stored in multiple copies and/or in multiple parts among the local memory 119, the memory devices 130, the memory device 140, and the host system 120.

Figure 2:
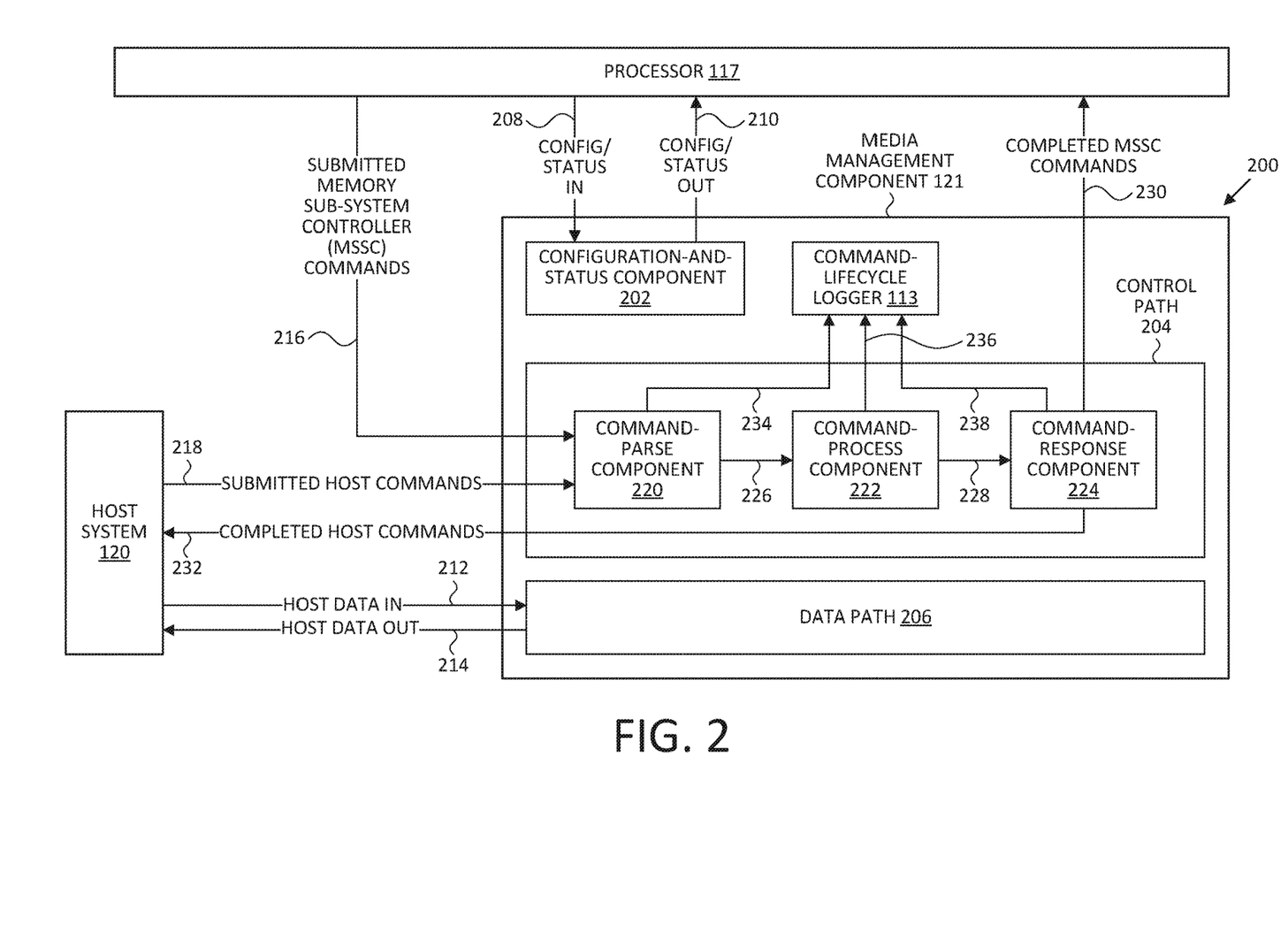
FIG. 2 is a block diagram that includes an example media management component of the memory sub-system controller of FIG. 1 in accordance with some embodiments of the present disclosure.

FIG. 2 depicts an example system architecture 200 in accordance with some embodiments of the present disclosure. The architecture 200 is provided by way of example and not limitation. In addition to the media management component 121, also depicted in FIG. 2 are the processor 117 and the host system 120. The media management component 121 includes various hardware sub-components that includes digital circuitry with dedicated (i.e., hard-coded) logic to perform the operations of the components described herein.

The media management component can include digital and analog circuitry to define a control path and a data path or portions of a control path and a data path. A data path refers to the logical course or path that user data and metadata follow as they move throughout the memory sub-system. The data path in the memory sub-system handles read and write data commands received from the host system. The data path encompasses the complete, end-to-end course taken by data as it is either written to or read from the underlying memory devices. A control path refers to the logical course or path that provides different control signals, for example, to components on the data path to control how the data path works properly. The control path and data path include digital circuitry, registers, and interconnecting buses. The media management component 121 can include a configuration-and-status component 202, a control path 204, and a data path 206.

The configuration-and-status component 202 can receive inbound configuration and status messages 208 from the processor 117, and can also transmit outbound configuration and status messages 210 to the processor 117. The inbound configuration and status messages 208 could relate to the processor 117 configuring various operational parameters of the media management component 121 via the configuration-and-status component 202, and could also relate to the processor 117 requesting status information regarding the media management component 121. The outbound configuration and status messages 210 could include responses to those status requests, as well as confirmation (or failure) responses regarding configuration requests. For clarity of presentation, connections between the configuration-and-status component 202 and other components of the media management component 121 are not shown in FIG. 2; such connections could be present however, and it could be via those connections that the configuration-and-status component 202 performs configuration requests, gathers information for status responses, and/or the like.

The control path 204 can include a command-parse component 220, a command-process component 222, and a command-response component 224. Any one of those components or any component described herein could be, for example, a circuit, such as a digital-logic circuit. The command-parse component 220 receives submitted memory sub-system controller (MSSC) commands 216 from the processor 117, and also receives submitted host commands 218 from the host system 120. Both sets of commands are parsed by the command-parse component 220, which then transmits the resulting parsed commands 226 to the command-process component 222.

The command-process component 222 processes the parsed commands 226, and transmits the resulting processed commands 228 to the command-response component 224.

The command-response component 224 then generates responses to the processed commands 228, and outputs the results: in the case of commands that originated as part of the submitted MSSC commands 216, the command-response component 224 transmits its results as completed MSSC commands 230 to the processor 117; in the case of commands that originated as part of the submitted host commands 218, however, the command-response component 224 transmits its results as completed host commands 232 for the host system 120.

Furthermore, when command logging is enabled in accordance with implementations of the present disclosure, in addition to processing the submitted commands it receives, the command-parse component 220 also transmits command-parse event records 234 to the command-lifecycle logger 113, informing the command-lifecycle logger 113 of the parsing status of those commands. Similarly, when command logging is enabled, in addition to processing the parsed commands 226, the command-process component 222 transmits command-process event records 236 to the command-lifecycle logger 113. Lastly, when command logging is enabled, in addition to completing the processed commands 228, the command-response component 224 transmits the command-response event records 238 to the command-lifecycle logger 113. Examples of the content of (e.g., parameters that can be included in) the command-parse event records 234, the command-process event records 236, and/or the command-response event records 238 are provided throughout the present disclosure.

The data path 206 receives host data requests 212 from the host system 120 and transmits host data responses 214 for the host system 120. For clarity of presentation, connections between the data path 206 and one or more of the memory devices 130 are not shown in FIG. 2. In operation, however, in at least some implementations of the present disclosure, host data passes via the data path 206 between the host system 120 and the memory devices 130. The host data requests 212 include data that the host system 120 is requesting be written to the memory devices 130, while the host data responses 214 include data that the host system 120 has requested be read from the memory devices 130.

Figure 3:
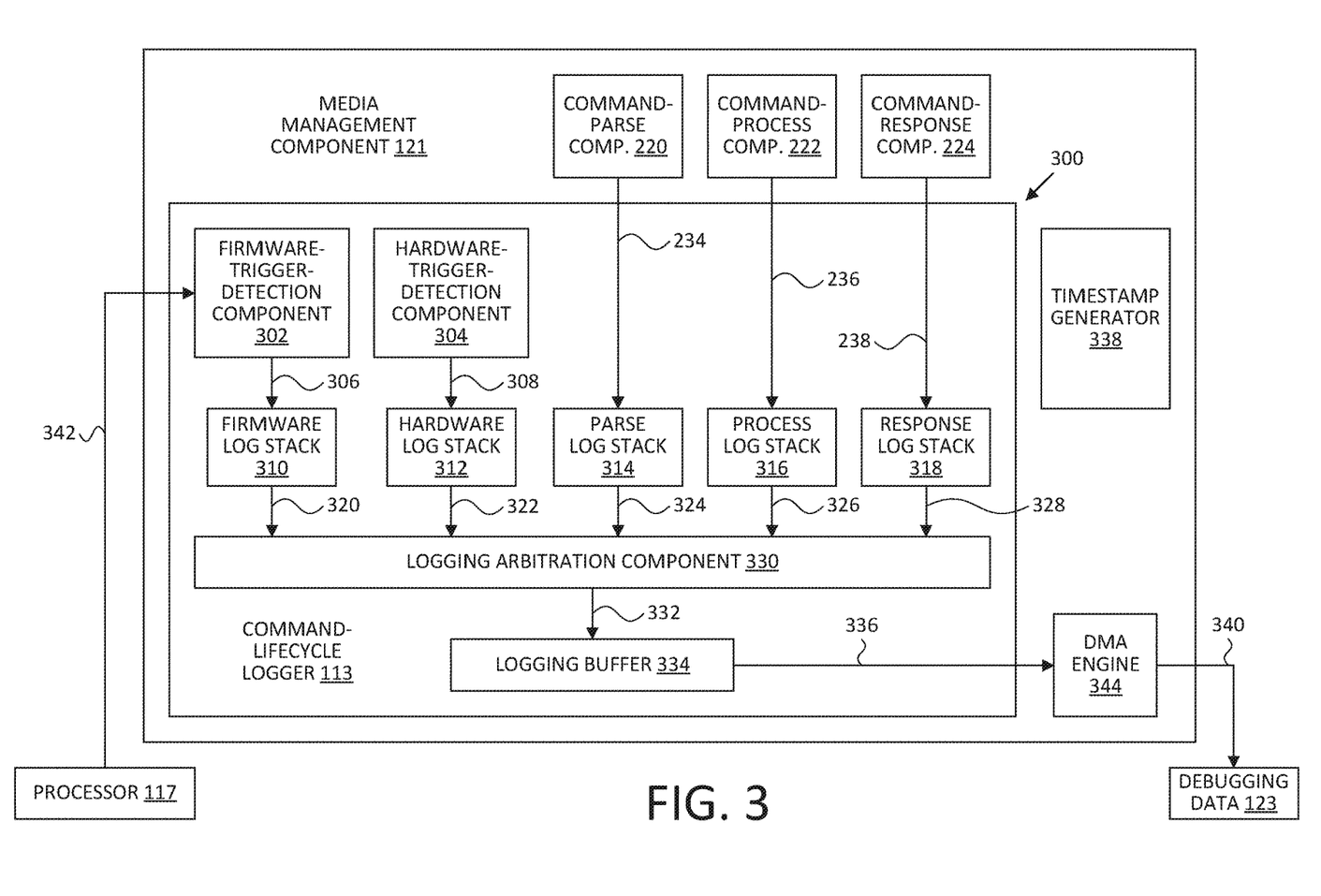
FIG. 3 is a block diagram that includes an example command-lifecycle logger of the media management component of FIG. 2 in accordance with some embodiments of the present disclosure.

FIG. 3 depicts an example architecture 300 of the command-lifecycle logger 113. As examples, any of the components of the media management component 121 or, more specifically, the command-lifecycle logger 113 can be realized as hardware circuits, as programmed components of, e.g., an FPGA.

The timestamp generator 338 can operate based on a free-running clock of the memory sub-system controller 115. Any of the herein-described components (e.g., circuits) could send requests for timestamp data to the timestamp generator 338 and receive responses from the timestamp generator 338, where those responses include the latest timestamp data generated by the timestamp generator 338.

Some examples of circuits that could request and receive time stamp data from the timestamp generator 338 include the firmware-trigger detection component 302, the hardware-trigger detection component 304, the command-parse component 220, the command-process component 222, and the command-response component 224. Other examples include the firmware-trigger logging stack 310, the hardware-trigger logging stack 312, the command-parse-event logging stack 314, the command-process-event logging stack 316, and the command-response-event logging stack 318. The logging arbitration component 330 may also request and receive timestamp data from the timestamp generator 338.

The firmware-trigger detection component 302 can receive firmware-trigger notifications 342 from the processor 117 upon the occurrence of a firmware-based triggering event. Some examples of firmware-based triggering events include a high-temperature event, a processor exception, an assertion, and an interrupt. Other types of firmware-based events could be included in various different embodiments. The firmware-trigger detection component 302 generates detected firmware-trigger records 306 based on the firmware-trigger notifications 342, and may also include timestamp data from the timestamp generator 338 in the detected firmware-trigger records 306.

In some embodiments, the firmware-trigger logging stack 310, upon receipt of a given firmware-trigger record in the detected firmware-trigger records 306, requests timestamp data from the timestamp generator 338 and adds that timestamp data to the given firmware-trigger record.

The hardware-trigger detection component 304 can detect the occurrence of one or more hardware-based triggering events. Some examples of hardware-based triggering events include an error-correction failure, a codeword fail bit count exceeding a fail-bit-count threshold, an invalid input command being received, and a media event (e.g., a read failure or a write failure) associated with one or more of the memory devices 130. Upon detecting a hardware-based triggering event, the hardware-trigger detection component 304 may generate a detected hardware-trigger record 308 and transmit that record to the hardware-trigger logging stack 312. Prior to this transmission, the hardware-trigger detection component 304 can request and receive timestamp data from the timestamp generator 338 and add that timestamp data to the generated detected hardware-trigger record 308. In some embodiments, the hardware-trigger logging stack 312, upon receipt of a given hardware-trigger record in the detected hardware-trigger records 308, requests timestamp data from the timestamp generator 338 and adds that timestamp data to the given hardware-trigger record.

Furthermore, as described above, the command-parse component 220 sends the command-parse event records 234 to the command-lifecycle logger 113, in particular to the command-parse-event logging stack 314. The command-process component 222 sends the command-process event records 236 to the command-process-event logging stack 316, and the command-response component 224 sends the command-response event records 238 to the command-response-event logging stack 318. In each case, timestamp data could be requested from the timestamp generator 338 and added to a given event record by either the sender or the recipient of the given event record.

As depicted in FIG. 3, the command-lifecycle logger 113 includes five logger-event stacks; the firmware-trigger logging stack 310, the hardware-trigger logging stack 312, the command-parse-event logging stack 314, the command-process-event logging stack 316, and the command-response-event logging stack 318. Each such logging stack can be configured as a first-in-first-out (FIFO) stack, a last-in-first-out (LIFO) stack, or any other type of stack deemed suitable for a given implementation. In this described example, each of the logging stacks 310-318 is implemented as a FIFO stack.

Figure 4:
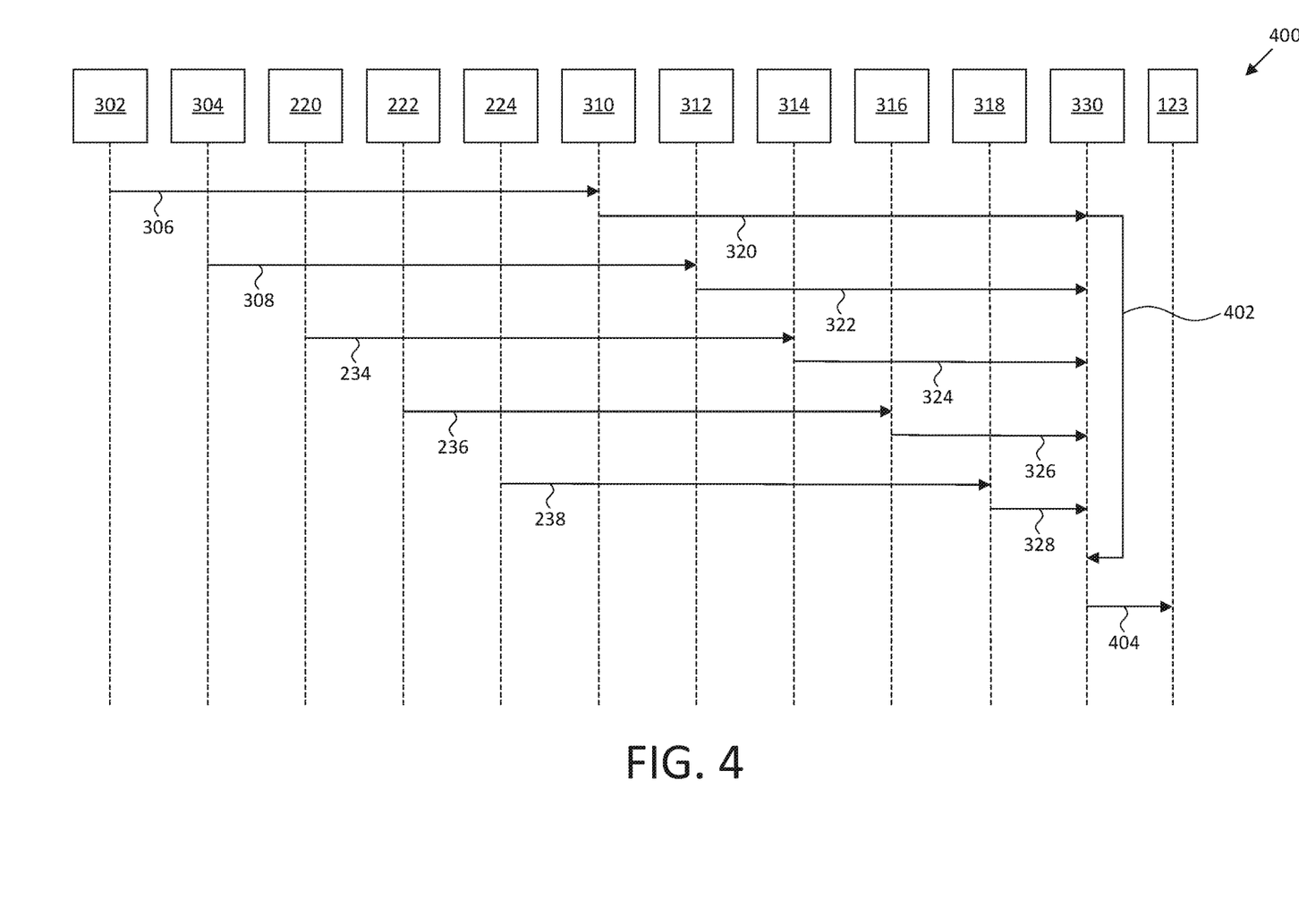
FIG. 4 is a message flow diagram depicting communications among various functional components of the memory sub-system controller of FIG. 1 and an example memory device in accordance with some embodiments of the present disclosure.

As shown in the message flow 400 of FIG. 4, the firmware-trigger logging stack 310 receives the detected firmware-trigger records 306 from the firmware-trigger detection component 302 and makes the stacked firmware-trigger records 320 available to the logging arbitration component 330. The hardware-trigger logging stack 312 receives the detected hardware-trigger records 308 from the hardware-trigger detection circuit 304 and makes the stacked hardware-trigger records 322 available to the logging arbitration circuit 330. The command-parse-event logging stack 314 receives the command-parse event records 234 from the command-parse circuit 220 and makes the stacked command-parse event records 324 available to the logging arbitration circuit 330. The command-process-event logging stack 316 receives the command-process event records 236 from the command-process circuit 222 and makes the stacked command-process event records 326 available to the logging arbitration circuit 330. The command-response-event logging stack 318 receives the command-response event records 238 from the command-response circuit 224 and makes the stacked command-response event records 328 available to the logging arbitration circuit 330.

As is also shown in the message flow 400, the logging arbitration component 330 conducts an arbitration 402, according to which the logging arbitration component 330 applies arbitration logic on the received records 320-328. The arbitration logic of the arbitration 402 could include augmenting, modifying, selecting, deleting, and/or otherwise processing one or more of the received records 320-328 in order to determine the content and/or arrangement of the records 320-328 for inclusion in the debugging data 123. The result of the arbitration 402 is the data-records transfer 404, according to which the logging arbitration component 330 transmits command-lifecycle data records for storage in the debugging data 123. It is noted that the data-records transfer 404 is a summary expression of the below-described transfer of the arbitrated records 332 between the logging arbitration component 330 and the logging buffer 334, the transfer of the buffered records 336 between the logging buffer 334 and the DMA engine 344, and the transfer of the data-storage debugging records 340 between the DMA engine 344 and the debugging data 123.

As an initial part of performing the arbitration 402, in some implementations, the logging arbitration component 330 can order the stacked records 320-328 that the logging arbitration component 330 receives from the logging stacks 310-318 according to the timestamp data contained in those stacked records 320-328. The logging arbitration component 330 can also use command-state (e.g., command-specific timer) data to aid in the sequencing process. Furthermore, the logging arbitration component 330 can assemble aggregated data records that include one or more records from one or more of the logging stacks 310-318. In some implementations, it is these aggregated records that are then processed according to arbitration logic as part of the arbitration 402.

The logging arbitration component 330 could implement any of a number of arbitration strategies when performing the arbitration 402. In some implementations, the arbitration 402 involves selecting records—from among the received stacked records 320-328 and/or the above-described aggregated records, as examples—for inclusion in the debugging data 123 using a round-robin approach. In other cases, the arbitration 402 includes using a weighted round-robin approach; in some such cases, the weights can be assigned by the firmware of the memory sub-system controller 115, perhaps by way of the processor 117 sending the inbound configuration and status messages 208 to the configuration-and-status component 202 of the media management component 121.

In various different implementations of the present disclosure that utilize weight values in the arbitration 402, the weight values can influence which types of trigger events have their associated records included in the debugging data 123. For example, some implementations may weigh hardware-based triggering events as being more important than firmware-based triggering events. Other implementations may do the opposite. Furthermore, even within such categories, certain types of hardware-based and/or firmware-based triggering events could be weighted as being more important than others.

Returning now to FIG. 3, the logging buffer 334 could be implemented as a LIFO buffer or a FIFO buffer, as examples. In this described example, the logging buffer 334 is implemented as a FIFO buffer. As depicted in FIG. 3, the logging buffer 334 receives the arbitrated records 332 from the logging arbitration component 330 and transmits the buffered records 336 to the DMA engine 344 for further processing and ensuing transmission to the debugging data 123. In some implementations, the logging buffer 334 is implemented as what is known as a ping-pong buffer, and assists the overall information flow by providing flow control and mitigating what is known as back pressure.

The DMA engine 344 can be a circuit that facilitates access for the media management component 121 to store data in the memory device 140 or in one or more of the memory devices 130. It is noted that, in some embodiments, the debugging data 123 is located in whole or in part in the host system 120—in such embodiments, the path between the media management component 121 and the debugging data 123 that is stored in the host system 120 might include a circuit element other than the DMA engine 344.

Furthermore, as described above in connection with FIG. 2, the media management component 121 includes the data path 206 that is used to access the memory devices 130. In that case, that access was on behalf of the host system 120. For such accesses, the media management component 121 may include a second DMA engine other than the DMA engine 344. That is, the DMA engine 344 may be dedicated to storing the debugging data 123. In some implementations, however, the DMA engine 344 is used by the media management component 121 both to access the memory devices 130 on behalf of the host system 120 and to access the memory devices 130 to store the debugging data 123.

The media management component 121 can store the records in local memory. The media management component 121 can include a buffer and/or DMA engine to transfer the records 336 to the memory devices 130, and then transmit the formatted command-lifecycle event records to the memory devices 130 as the data-storage debugging records 340 for storage in the debugging data 123.

The debugging data 123 is primarily described in this disclosure as being located in the memory devices 130, which is a data-storage location that is external to the media management component 121. Another example of data storage that is external to the media management component 121 and that could be used to store some or all of the debugging data 123 is data storage on the host system 120. All or part of the debugging data 123 could be located in data storage (e.g., SRAM) that is internal to the media management component 121, perhaps also internal to the command-lifecycle logger 113. Moreover, all or part of the debugging data 123 could be located in the local memory 119. Another example data-storage location for all or part of the debugging data 123 is the memory device 140. Both the memory devices 130 and the memory device 140 are examples of memory devices that are external to the memory sub-system controller 115 but internal to the memory sub-system 110.

Figure 5:
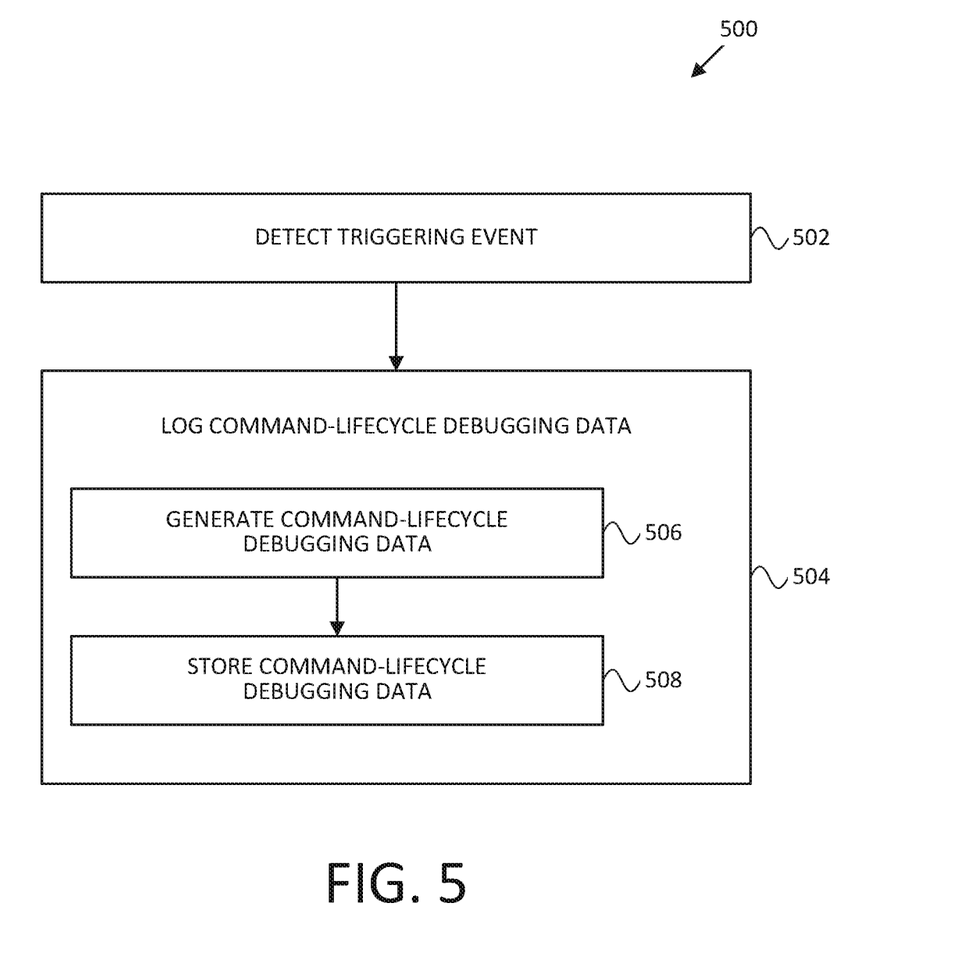
FIG. 5 is a flow diagram of an example method for debugging and logging in a memory sub-system that can be performed by the memory sub-system controller of FIG. 1 in accordance with some embodiments of the present disclosure.

FIG. 5 is a flow diagram of an example method 500 for debugging and logging in a memory sub-system such as the memory sub-system 110 in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the command-lifecycle logger 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

At operation 502, the command-lifecycle logger 113 detects a triggering event for logging command-lifecycle debugging data. In response to detecting the triggering event, at operation 504, the command-lifecycle logger 113 generates command-lifecycle debugging data (see operation 506) and stores the generated command-lifecycle debugging data 123 in data storage (see operation 508). Various ways in which the command-lifecycle logger 113 can perform each of the operations 502-508 are described throughout this disclosure.

The stored command-lifecycle debugging data can include a number of different parameters as described herein. As one example, the debugging data 123 can include data identifying the detected triggering event. As another example, the debugging data 123 can include data records associated with a plurality of lifecycle stages of execution of associated commands. As examples, the debugging data 123 can include data from the start, dispatch, and/or completion of execution of a given command. Some examples include data from the command-parse event records 234, the command-process event records 236, and the command-response event records 238. Moreover, the debugging data 123 can include data records that provide internal state (e.g., a command-specific timestamp, counter, and/or the like) of commands during their execution. The lifecycle-stage data provides traces of the command traversing the control path 204 of the memory sub-system.

Furthermore, one or more records in the debugging data 123 can include a command identifier that identifies a particular command, the execution of which is reflected in the debugging data 123. Moreover, in addition to command state, which can be a command-internal timer that iterates during execution of a given command, records in the debugging data 123 can include timestamp data from the timestamp generator 338, reflecting timestamps that originate from a free-running clock, such timestamp data being global with respect to the execution of any given command.

Other types of data that could be included in the records of the debugging data 123 include the command type (e.g., read, write), as well as the address (e.g., block address, media address) to which the command is directed in, e.g., one or more of the memory devices 130. This address data can identify a logical address and/or a physical address. Data that identifies a given trigger (e.g., a hardware-based trigger or a firmware-based trigger) can also be included in the records of the debugging data 123. All of these are examples, and those of skill in the art having the benefit of this disclosure may see fit to include one or more other types of debugging data instead of or in addition to one or more of the types of debugging data that are listed as examples in this disclosure.

Figure 6:
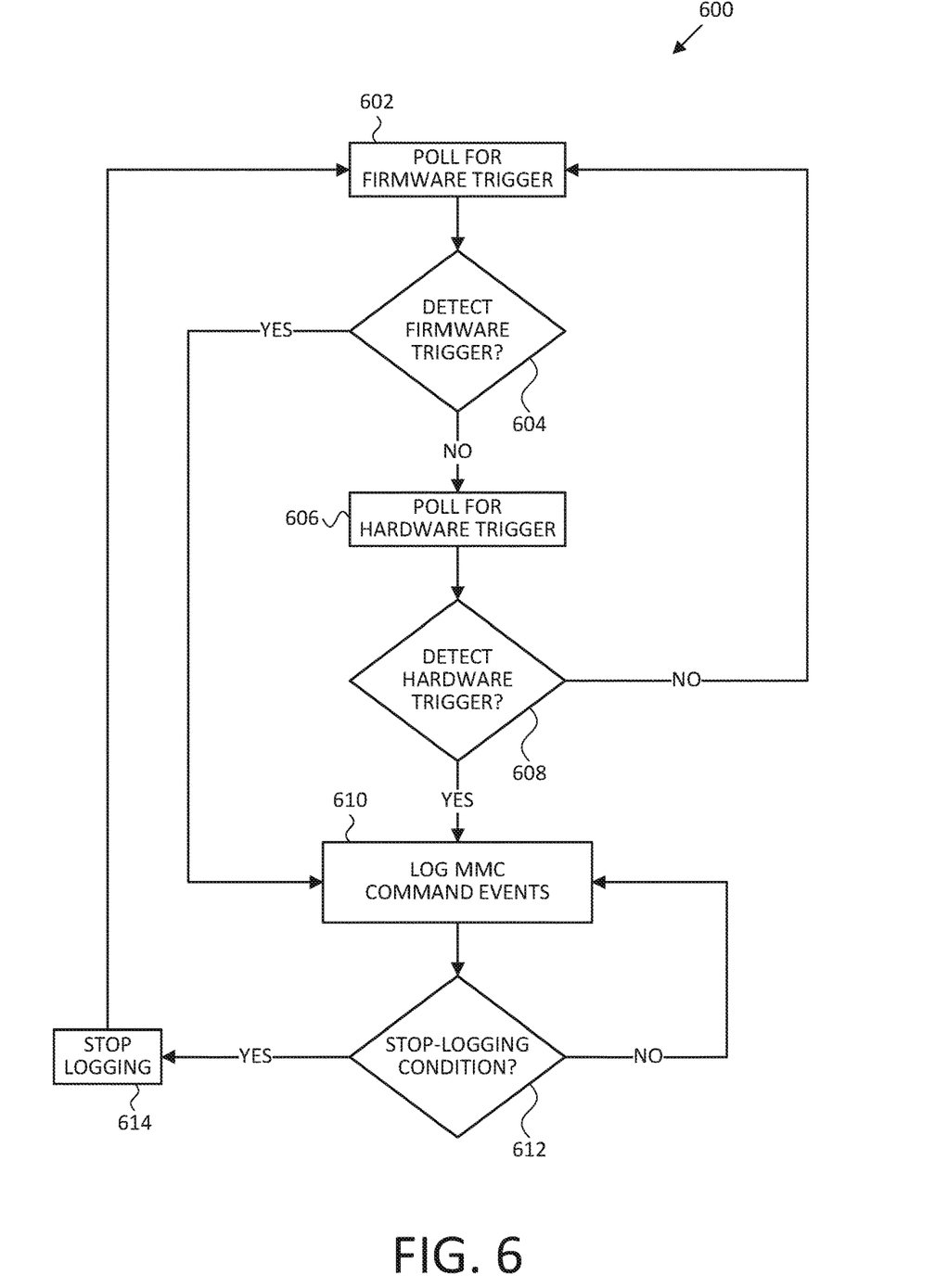
FIG. 6 is a flow diagram depicting an example method that includes some example operations performed by the memory sub-system controller of FIG. 1 in accordance with some embodiments of the present disclosure.

FIG. 6 is a flow diagram of an example method 600 for debugging and logging in a memory sub-system in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the command-lifecycle logger 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

At operation 602, the command-lifecycle logger 113 polls (e.g., checks) for the occurrence of a firmware-based triggering event, such as any of the firmware-based triggering events described herein. In some implementations, it is the firmware-trigger detection component 302 that performs operation 602, which can involve the firmware-trigger detection component 302 checking for the receipt of a firmware-trigger notification 342 from the processor 117.

The command-lifecycle logger 113 (e.g., the firmware-trigger detection component 302) then evaluates (see operation 604) whether it has indeed detected a firmware-based triggering event. If so, control proceeds to operation 610, which is described below. If not, control proceeds to operation 606.

The command-lifecycle logger 113, at operation 606, polls for the occurrence of a hardware-based triggering event, such as any of the hardware-based triggering events described herein. In some implementations, it is the hardware-trigger detection component 304 that performs operation 606. Control then proceeds to operation 608, at which the command-lifecycle logger 113 (e.g., the hardware-trigger detection component 304) evaluates whether it has detected the occurrence of a hardware-based triggering event. If not, control returns to operation 602. If so, control proceeds to operation 610, which is described below.

At operation 610, the command-lifecycle logger 113 logs command-lifecycle debugging data (e.g., media-management-component command events). A variety of ways in which the command-lifecycle logger 113 can generate and store the debugging data 123 are described throughout this disclosure.

In some embodiments, such as the embodiment that is depicted in and described in connection with the method 600 of FIG. 6, the command-lifecycle logger 113 evaluates (e.g., periodically, on an interrupt basis, and/or the like) whether a stop-logging condition is present, such that the command-lifecycle logger 113 should cease the generation and storing of records in the debugging data 123, at least until a next triggering event occurs. This logic is represented at operation 612, at which the command-lifecycle logger 113 evaluates whether or not a stop-logging condition is present. If so, the command-lifecycle logger 113 stops logging (e.g., stops generating and storing the debugging data 123) (see operation 614). If not, control returns to operation 610, and the command-lifecycle logger 113 continues logging (e.g., continues generating and storing the debugging data 123).

In some implementations, the referenced stop-logging condition includes an elapsing of a predetermined amount of time. Instead or in addition the stop-logging condition can include a predetermined amount of data having been stored in (e.g., added to with respect to the instant triggering event) the debugging data 123. One example predetermined amount of data is one GB, though certainly other predetermined amounts of data could be used as logging-limiting parameters in various different implementations. In other implementations, such an amount of stored data is used as a limiting factor, but not to stop logging, rather to cap the amount of data that is stored in the debugging data 123 in connection with any given triggering event. In such implementations, it could be that the latest 1 GB of data records are kept in the debugging data 123 but that the logging itself does not stop until it is manually stopped and/or some other stop-logging event is detected.

Figure 7:
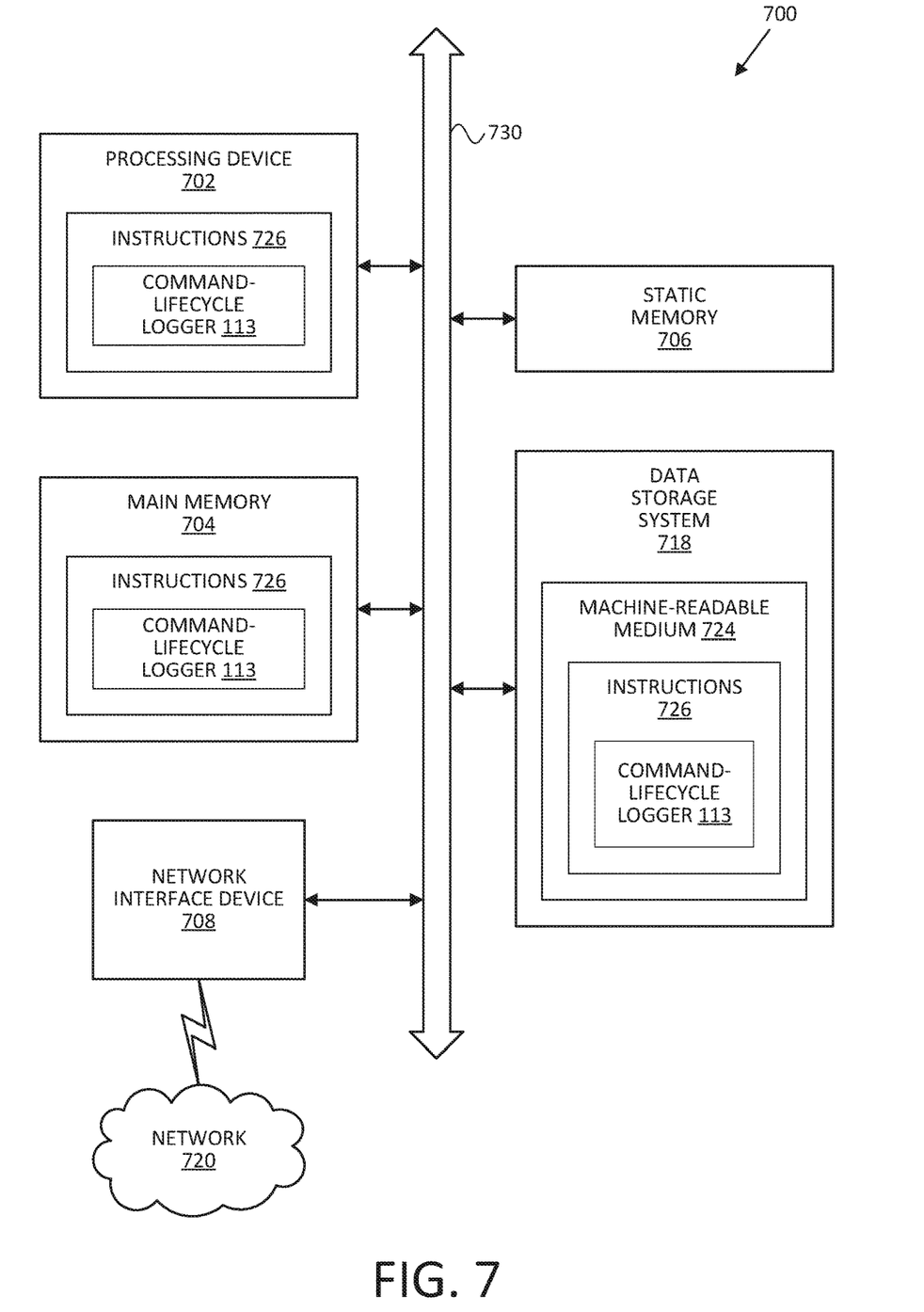
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., ROM, flash memory, DRAM such as SDRAM or RDRAM, etc.), a static memory 706 (e.g., flash memory, SRAM, etc.), and a data storage system 718, which communicate with each other via a bus 730.

The processing device 702 represents one or more general-purpose processing devices such as a microprocessor, a central processing unit (CPU), or the like. More particularly, the processing device 702 can be a complex instruction set computing (CISC) microprocessor, a reduced instruction set computing (RISC) microprocessor, a very long instruction word (VLIW) microprocessor, or a processor implementing other instruction sets, or processors implementing a combination of instruction sets. The processing device 702 can also be one or more special-purpose processing devices such as an ASIC, an FPGA, a digital signal processor (DSP), a network processor, or the like. In at least one embodiment, the processing device 702 is configured to execute instructions 726 for performing the operations discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In an embodiment, the instructions 726 include instructions to implement functionality corresponding to a command-lifecycle logger (e.g., the command-lifecycle logger 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" should also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed description have been presented in terms of algorithms and symbolic representations of operations on data bits within a computer memory. These algorithmic descriptions and representations are the ways that are used by those skilled in the data-processing arts to most effectively convey the substance of their work to others skilled in such arts. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and/or otherwise manipulated. It has proven convenient at times, principally for reasons of common usage, to refer to these signals as bits, values, elements, symbols, characters, terms, numbers, and/or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within a computer system's registers and memories into other data similarly represented as physical quantities within the computer system's registers and memories or other such information-storage systems.

The present disclosure also relates to an apparatus for performing the operations that are described herein. This apparatus can be specially constructed for the intended purposes, or it can include a general-purpose computer selectively activated or reconfigured by a computer program stored in the computer. Such a computer program can be stored in a computer-readable storage medium such as but not limited to any type of disk including floppy disks, optical disks. CD-ROMs, magnetic-optical disks, ROMs, RAMs, EPROMs, EEPROMs, magnetic or optical cards, and/or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the present disclosure. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic device or devices) to perform a process according to the present disclosure. A machine-readable medium includes any mechanism for storing information in a form readable by a machine (e.g., a computer). In some implementations, a machine-readable (e.g., computer-readable) medium includes a machine-readable (e.g., computer-readable) storage medium such as a ROM. RAM, magnetic disk storage media, optical storage media, flash memory devices, and/or the like.

In the foregoing specification, some example implementations of the disclosure have been described. It will be evident that various modifications can be made thereto without departing from the broader scope and spirit of the disclosure as set forth in the following claims. The specification and drawings are, accordingly, to be regarded in an illustrative sense rather than in a restrictive sense. Below is a non-exhaustive list of examples of implementations of the present disclosure.

Example 1 is a system that includes a plurality of memory components; and a processing device that includes a command-lifecycle logger component that is configured to perform command-lifecycle-logging operations including detecting a triggering event for logging command-lifecycle debugging data; and, responsive to detecting the triggering event, logging command-lifecycle debugging data, where logging command-lifecycle debugging data includes generating the command-lifecycle debugging data; and storing the generated command-lifecycle debugging data in data storage.

Example 2 is the subject matter of Example 1, where the processing device includes a media management component, and where the media management component includes the command-lifecycle logger component.

Example 3 is the subject matter of either Example 1 or Example 2, where the triggering event includes a hardware-based triggering event.

Example 4 is the subject matter of Example 3, where the hardware-based triggering event includes an error-correction-failure event.

Example 5 is the subject matter of any of the Examples 1-4, where the triggering event includes a firmware-based triggering event.

Example 6 is the subject matter of any of the Examples 1-5, where the command-lifecycle debugging data includes data identifying the detected triggering event.

Example 7 is the subject matter of any of the Examples 1-6, where the command-lifecycle debugging data includes data records associated with a plurality of lifecycle stages of execution of associated commands.

Example 8 is the subject matter of any of the Examples 1-7, where the processing device includes a media management component, the media management component includes the command-lifecycle logger component, and the command-lifecycle logger component includes (i) a plurality of logger-event stacks, each of which is configured to perform operations including receiving logger-event data from a corresponding component in the media management component and (ii) a logging arbitration component configured to perform operations including (a) receiving logger-event data from each of the logger-event stacks and (b) generating arbitrated logger-event data by processing the received logger-event data using logger-event-arbitration logic.

Example 9 is the subject matter of any of the Examples 1-8, where the data storage includes data storage that is internal to the media management component.

Example 10 is the subject matter of any of the Examples 1-9, where the data storage includes data storage that is external to the media management component.

Example 11 is the subject matter of Example 10, where the data storage includes data storage that is internal to the processing device.

Example 12 is the subject matter of either Example 10 or Example 11, where the data storage includes data storage on a memory device that is external to the processing device.

Example 13 is the subject matter of any of the Examples 1-12, the command-lifecycle-logging operations further including detecting a stop-logging condition, and responsively stopping logging command-lifecycle debugging data.

Example 14 is the subject matter of Example 13, where the stop-logging condition includes an elapsing of a predetermined amount of time.

Example 15 is the subject matter of either Example 13 or Example 14, where the stop-logging condition includes storing a predetermined amount of command-lifecycle debugging data in data storage.

Example 16 is a method that includes detecting, by a command-lifecycle logger component of a media management component of a memory-subsystem, a triggering event for logging command-lifecycle debugging data; and, responsive to detecting the triggering event, logging, by the command-lifecycle logger component, command-lifecycle debugging data, where logging command-lifecycle debugging data includes generating the command-lifecycle debugging data; and storing the generated command-lifecycle debugging data in data storage.

Example 17 is the subject matter of Example 16, where the command-lifecycle debugging data includes data records associated with a plurality of lifecycle stages of execution of associated commands.

Example 18 is the subject matter of either Example 16 or Example 17, where logging command-lifecycle debugging data further includes receiving, at each of a plurality of logger-event stacks of the command-lifecycle logger component, logger-event data from a corresponding component in the media management component; receiving, at a logging arbitration component of the command-lifecycle logger component, logger-event data from each of the logger-event stacks; and generating, by the logging arbitration component, arbitrated logger-event data by processing the received logger-event data using logger-event-arbitration logic.

Example 19 is the subject matter of any of the Examples 16-18, further including detecting a stop-logging condition, and responsively stopping logging command-lifecycle debugging data.

Example 20 is a non-transitory machine-readable storage medium containing instructions that, when executed by a processing device, cause the processing device to perform operations including detecting, by a command-lifecycle logger component of a media management component of a memory-subsystem, a triggering event for logging command-lifecycle debugging data; and, responsive to detecting the triggering event, logging, by the command-lifecycle logger component, command-lifecycle debugging data, where logging command-lifecycle debugging data includes generating the command-lifecycle debugging data; and storing the generated command-lifecycle debugging data in data storage.

What is claimed is:

1. A system comprising:
a plurality of memory components; and
a processing device configured to perform operations comprising:
   detecting a triggering event for logging command-lifecycle debugging data;
   in response to detecting the triggering event:
      generating the command-lifecycle debugging data;
      storing the generated command-lifecycle debugging data in data storage;
      detecting a stop-logging condition; and
      in response to the detected stop-logging condition, stopping logging command-lifecycle debugging data;
   receiving logger-event data;
   storing the logger-event data in a plurality of logger-event stacks;
   accessing logger-event data from each of the logger-event stacks; and
   generating arbitrated logger-event data by selectively including the accessed logger-event data in the arbitrated logger-event data based on weight values of the accessed logger-event data, such that hardware-based trigger events are weighed as being more important than firmware-based triggering events.

2. The system of claim 1, wherein the triggering event comprises a hardware-based triggering event.

3. The system of claim 2, wherein the hardware-based triggering event comprises an error-correction-failure event.

4. The system of claim 1, wherein the triggering event comprises a firmware-based triggering event.

5. The system of claim 1, wherein the command-lifecycle debugging data comprises data identifying the detected triggering event.

6. The system of claim 1, wherein the command-lifecycle debugging data comprises data records associated with a plurality of lifecycle stages of execution of associated commands.

7. The system of claim 1, wherein the stop-logging condition comprises an elapsing of a predetermined amount of time.

8. The system of claim 1, wherein the stop-logging condition comprises storing a predetermined amount of command-lifecycle debugging data in data storage.

9. The system of claim 1, wherein the command-lifecycle debugging data comprises an identifier of a command and an address to which the command is directed.

10. The system of claim 1, wherein the command-lifecycle debugging data comprises a command-internal timestamp that iterates during execution of a command and timestamp data reflecting timestamps from a clock that is global across multiple commands.

11. The system of claim 1, wherein the command-lifecycle debugging data comprises data for a start of a command, states of the command, and completion of the command.

12. The system of claim 1, wherein the generating of the arbitrated logger-event data further comprises:
   ordering the accessed logger-event data based on timestamp data of each record in the plurality of logger-event stacks.

13. The system of claim 1, wherein the operations further comprise:
   providing, to a host system, access to at least a subset of the command-lifecycle debugging data.

14. A method comprising:
   detecting, by a memory sub-system, a triggering event for logging command-lifecycle debugging data;
   responsive to detecting the triggering event:
      generating, by the memory sub-system, the command-lifecycle debugging data;
      storing the generated command-lifecycle debugging data in data storage;
      detecting a stop-logging condition; and
      in response to the detected stop-logging condition, stopping logging command-lifecycle debugging data;
   receiving logger-event data;
   storing the logger-event data in a plurality of logger-event stacks;
   accessing logger-event data from each of the logger-event stacks; and
   generating arbitrated logger-event data by selectively including the accessed logger-event data in the arbitrated logger-event data based on weight values of the accessed logger-event data, such that hardware-based trigger events are weighed as being more important than firmware-based triggering events.

15. The method of claim 14, wherein the command-lifecycle debugging data comprises data records associated with a plurality of lifecycle stages of execution of associated commands.

16. The method of claim 14, wherein the stop-logging condition comprises an elapsing of a predetermined amount of time.

17. The method of claim 14, wherein the stop-logging condition comprises storing a predetermined amount of command-lifecycle debugging data in data storage.

18. A non-transitory machine-readable storage medium containing instructions that, when executed by a processing device, cause the processing device to perform operations comprising:
   detecting a triggering event for logging command-lifecycle debugging data;
   in response to detecting the triggering event:
      generating the command-lifecycle debugging data;
      storing the generated command-lifecycle debugging data in data storage;
      detecting a stop-logging condition; and
      in response to the detected stop-logging condition, stopping logging command-lifecycle debugging data;
   receiving logger-event data;
   storing the logger-event data in a plurality of logger-event stacks;
   accessing logger-event data from each of the logger-event stacks; and
   generating arbitrated logger-event data by selectively including the accessed logger-event data in the arbitrated logger-event data based on weight values of the accessed logger-event data, such that hardware-based trigger events are weighed as being more important than firmware-based triggering events.

19. The non-transitory machine-readable storage medium of claim 18, wherein the command-lifecycle debugging data comprises a command identifier and an address to which the command is directed.

\* \* \* \* \*